United States Patent
Seki

(10) Patent No.: US 6,990,358 B2
(45) Date of Patent: Jan. 24, 2006

(54) SYSTEM AND METHOD FOR MONITORING RECEIVING PORTION IN WIRELESS BASE STATION SYSTEM, AND RECORDING MEDIUM ON WHICH MONITORING PROGRAM IS RECORDED

(75) Inventor: Yosikazu Seki, Saitama (JP)

(73) Assignee: NEC Corporation, Tokyo (JP)

( * ) Notice: Subject to any disclaimer, the term of this patent is extended or adjusted under 35 U.S.C. 154(b) by 525 days.

(21) Appl. No.: 10/198,995

(22) Filed: Jul. 22, 2002

(65) Prior Publication Data
US 2003/0022691 A1 Jan. 30, 2003

(30) Foreign Application Priority Data
Jul. 25, 2001 (JP) ........................ 2001-223729

(51) Int. Cl.
*H04B 1/38* (2006.01)

(52) U.S. Cl. .............. 455/560; 455/67.13; 455/570
(58) Field of Classification Search .............. 455/550.1, 455/553.1, 560, 561, 565, 570, 403, 501, 455/63.1, 67.11, 67.13, 67.14, 114.2, 115.1, 455/115.2, 135
See application file for complete search history.

(56) References Cited

FOREIGN PATENT DOCUMENTS

| | | |
|---|---|---|
| JP | 2503889 | 4/1996 |
| JP | 9-200069 | 7/1997 |
| JP | 11-186956 | 7/1999 |
| JP | 2001-77767 | 3/2001 |

*Primary Examiner*—Edward F. Urban
*Assistant Examiner*—Thuan T. Nguyen
(74) *Attorney, Agent, or Firm*—McGinn & Gibb, PLLC

(57) ABSTRACT

A noise figure (NF) of an outdoor receiver amplifier and a loss in a feeder are automatically computed to report a correct level of received total wideband power (RTWP). A received signal code power (RSCP) value and a bit error rate (BER) value are computed by demodulating in a wireless portion of a wireless base station system a pilot signal generated in the outdoor receiver amplifier, and the feeder loss and the NF value are computed in a detection portion from the RSCP value and the BER value. Further, a received total wideband power value (RTWP value) including a value relating to the NF value is reported to a host unit by an RTWP processing portion.

23 Claims, 9 Drawing Sheets

FIG.7

| | OUTDOOR RECEIVER AMPLIFIER NFa | | FEEDER NFb | WIRELESS PORTION NFc | TOTAL NF NFt |
|---|---|---|---|---|---|
| | DUP, BPF (PASSIVE DEVICE) | LNA NFd | | | |
| ① | 1 dB | 2 dB | 30 dB | 5 dB | 3.6 dB |
| ② | 1 dB | 1 dB | 30 dB | 5 dB | 2.8 dB |
| ③ | 1 dB | 2 dB | 25 dB | 5 dB | 3.2 dB |

FIG. 8

|   | N F (dB) | INPUT LEVEL (dBm) | RTWP REPORT VALUE (dBm) |
|---|---|---|---|
| ① | 3.6 | −108 | −102.8 |
|   |   | −105 | −101.7 |
|   |   | −103 | −100.6 |
|   |   | −100 | −98.7 |
|   |   | −90 | −89.8 |
| ② | 2.8 | −108 | −103.4 |
|   |   | −105 | −102.1 |
|   |   | −103 | −101.0 |
|   |   | −100 | −98.9 |
|   |   | −90 | −89.8 |

SYSTEM AND METHOD FOR MONITORING RECEIVING PORTION IN WIRELESS BASE STATION SYSTEM, AND RECORDING MEDIUM ON WHICH MONITORING PROGRAM IS RECORDED

BACKGROUND OF THE INVENTION

1. Field of the Invention

The present invention relates to a system and method for monitoring a receiving portion in a wireless base station system and to a recording medium on which a monitoring program is recorded. More particularly, the present invention relates to a system and method for monitoring a receiving portion in a wireless base station system which performs communication with mobile terminals and to a recording medium on which a monitoring program is recorded.

2. Description of the Prior Art

In wireless base station systems, measurements relating to a wireless level diagram are made. In particular, when a noise figure (NF), gain, and feeder loss of an outdoor receiver amplifier are actually measured, there is a need to move measuring devices to the measurement places. On the other hand, desktop measurements are made in such a manner that a feeder loss is obtained from a feeder length and a determination is made by a theoretical process as to whether the total NF is appropriate in terms of wideband code division multiple access (WCDMA) system, and the determination result is verified with the above-mentioned actual device. A difference between NF characteristics which occurs in a case where the outdoor receiver amplifier is configured for a multivendor service is multiplied by an offset according to station data or the like to form a WCDMA system parameter.

However, with the process including moving measuring devices to measurement places, there is a disadvantage that it is necessary to perform operations in dangerous places, e.g., a place immediately below an antenna in the case of measurement of an outdoor receiver amplifier. There is also a disadvantage that troublesome operations for computing feeder loss, a total NF, etc., are required.

Systems for the above-described kind of receiving portion monitoring are disclosed in Japanese Patent Laid-Open No. 9-200069 (hereinafter referred to as related art document 1) and No. 11-186956 (hereinafter referred to as related art document 2) and Japanese Patent Publication No. 2503889 (hereinafter referred to as related art document 3).

The technique disclosed in the related art document 1 relates to a device for detecting a fault in a high-sensitivity wireless portion installed outside a building. A detection of a fault in an outdoor receiver is performed by making determination using monitoring means 35 as to whether a pilot signal level is lower than a reference value. The invention disclosed in this document, however, differs from the present invention in that it does not use the bit error rate (BER) as a determination criterion.

The technique disclosed in the related art document 2 uses means for detecting a fading pitch from a reception signal, BER detection means, received input level measuring means in a mobile wireless portion, and appropriate moving speed detection means for deriving a current appropriate moving speed from fading pitch detection information, BER, and received input level information. This technique enables a user to reduce a deterioration in communication quality due to fading by considering the derived moving speed. However, the invention disclosed in this document differs from the present invention in that it is concerned with a mobile wireless portion and aims to reduce deterioration in communication quality due to fading.

The technique disclosed in the related art document 3 relates to a device for detecting a fault in a receiver amplifier installed outside a building and makes fault determination by preparing a fault detection reference value from a standard attenuation value relating to leakage of a transmitted signal from a transmitter to a receiving circuit in an antenna-sharing unit, a standard amplification value of the receiver amplifier, and transmission power information of the transmitter, and by comparing electric field intensity information output from an electric field detecting portion with the reference value. The invention disclosed in this document differs from the present invention in that it uses no pilot signal.

BRIEF SUMMARY OF THE INVENTION

An object of the present invention is to provide, as means capable of solving the above-described problem, a system and method for monitoring a receiving portion in a wireless base station system in which the NF and feeder loss of an outdoor receiver amplifier are automatically computed to report a correct level of received total wideband power (RTWP).

To attain the above-described object, according to one aspect of the present invention, there is provided a receiving portion monitoring system in a wireless base station system including receiving and amplifying means for amplifying a received signal, and wireless base station means for demodulating a signal output from the receiving and amplifying means and for detecting a fault in the receiving and amplifying means on the basis of the demodulated signal, the receiving and amplifying means including a pilot signal generation portion which generates a pilot signal for detection of a fault, and an amplifier which amplifies the received signal and the pilot signal, and the wireless base station means including a wireless portion which demodulates a signal output from the amplifier and computes a received signal code power (RSCP) value and a BER value from the demodulated signal, a detection portion which computes a feeder loss and an NF value between the receiving and amplifying means and the wireless base station means from the computed RSCP and BER values, and an RTWP processing portion which outputs an RTWP value including a value relating to the NF value detected by the detection portion.

According to another aspect of the present invention, there is provided a receiving portion monitoring method for a wireless base station system including receiving and amplifying means for amplifying a received signal, and wireless base station means for demodulating a signal output from the receiving and amplifying means and for detecting a fault in the receiving and amplifying means on the basis of the demodulated signal, the receiving and amplifying means including a pilot signal generation portion which generates a pilot signal for detection of a fault, and an amplifier which amplifies the received signal and the pilot signal, the method comprising, as steps to be performed in the wireless base station means, a first step of demodulating a signal output from the amplifier and computing an RSCP value and a BER value from the demodulated signal, a second step of computing a feeder loss and an NF value between the receiving and amplifying means and the wireless base station means from the computed RSCP and BER values, and a third step of outputting an RTWP value including a value relating to the NF value detected in the second step.

According to still another aspect of the present invention, there is provided a recording medium on which is recorded a program for making a computer carry out a receiving portion monitoring method for a wireless base station system including receiving and amplifying means for amplifying a received signal, and wireless base station means for demodulating a signal output from the receiving and amplifying means and for detecting a fault in the receiving and amplifying means on the basis of the demodulated signal, the receiving and amplifying means including a pilot signal generation portion which generates a pilot signal for detection of a fault, and an amplifier which amplifies the received signal and the pilot signal, the wireless base station means including the recording medium, the program including a first step of demodulating a signal output from the amplifier and computing an RSCP value and a BER value from the demodulated signal, a second step of computing a feeder loss and an NF value between the receiving and amplifying means and the wireless base station means from the computed RSCP and BER values, and a third step of outputting an RTWP value including a value relating to the NF value detected in the second step.

According to the present invention, the system is arranged to automatically compute the NF of the outdoor receiver amplifier and the loss in the feeder and to report correct RTWP, thus solving the above-described problem.

BRIEF DESCRIPTION OF THE DRAWINGS

FIG. 7 is a diagram of the NF level in the wireless base station system;

FIG. 8 is a diagram showing NF/RTWP characteristics of the wireless base station system.

DETAILED DESCRIPTION OF THE PREFERRED EMBODIMENTS

Figure 1:
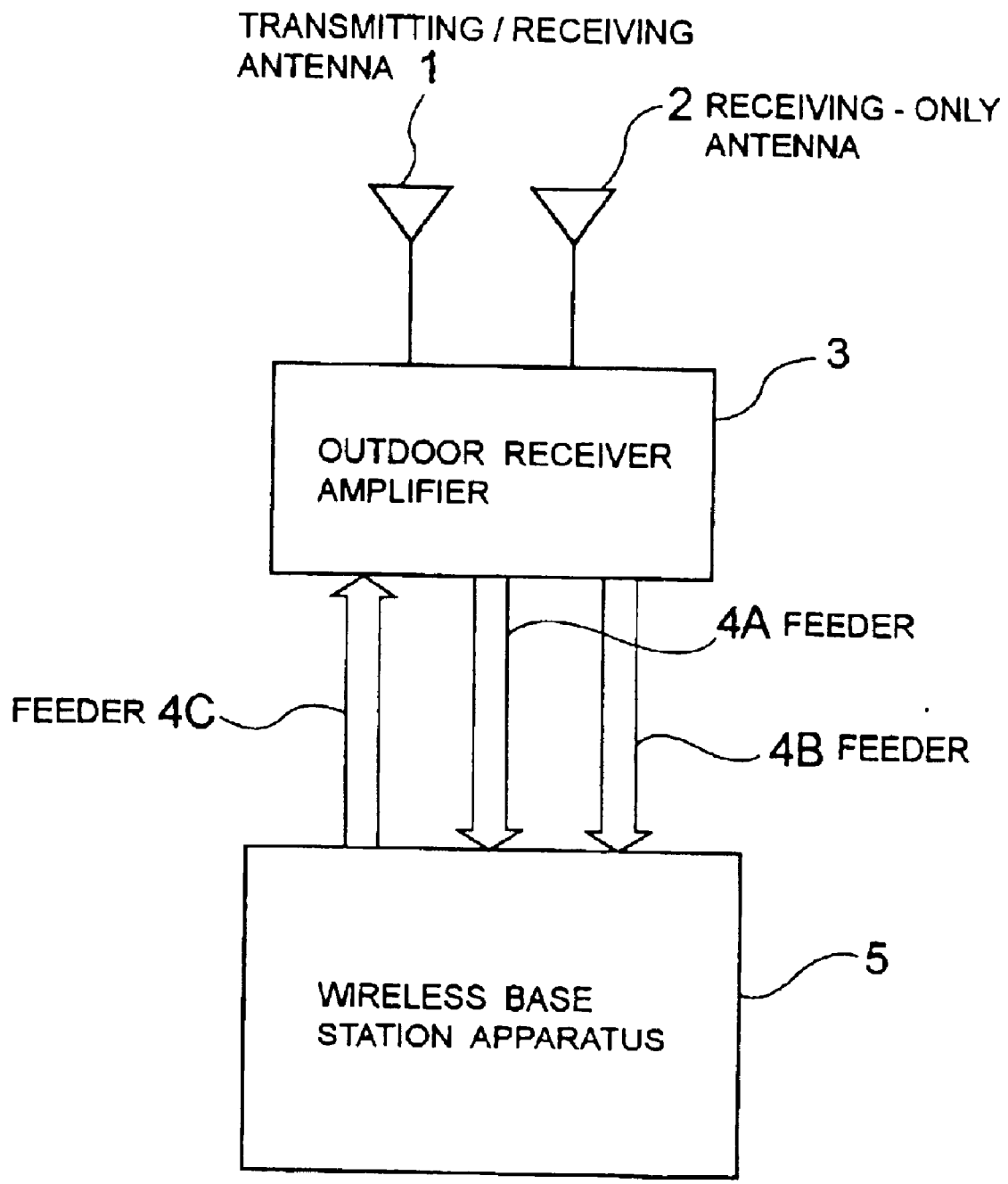
FIG. 1 is a diagram showing a configuration of a wireless base station system in the best mode of implementation of the present invention.

Embodiments of the present invention will be described with reference to the accompanying drawings. FIG. 1 is a diagram showing the configuration of a wireless base station system in the best mode of implementation of the invention. Referring to FIG. 1, the wireless base station system is constituted by a transmitting/receiving antenna 1, a receiving-only antenna 2, an outdoor receiver amplifier 3 which separates a transmitted wireless signal and a received wireless signal from each other and performs low-nose amplification of the received wireless signal only, a wireless base station apparatus 5 which performs modulation/demodulation of transmitted/received wireless signals and detects a malfunction of the outdoor receiver amplifier 3, feeders 4A and 4B connected between the outdoor receiver amplifier 3 and the wireless base station apparatus 5 and used for superimposition of transmitted/received wireless signals and power supplied to the outdoor receiver amplifier 3, and a feeder 4C used for transmitted wireless signal transmission.

Figure 2:
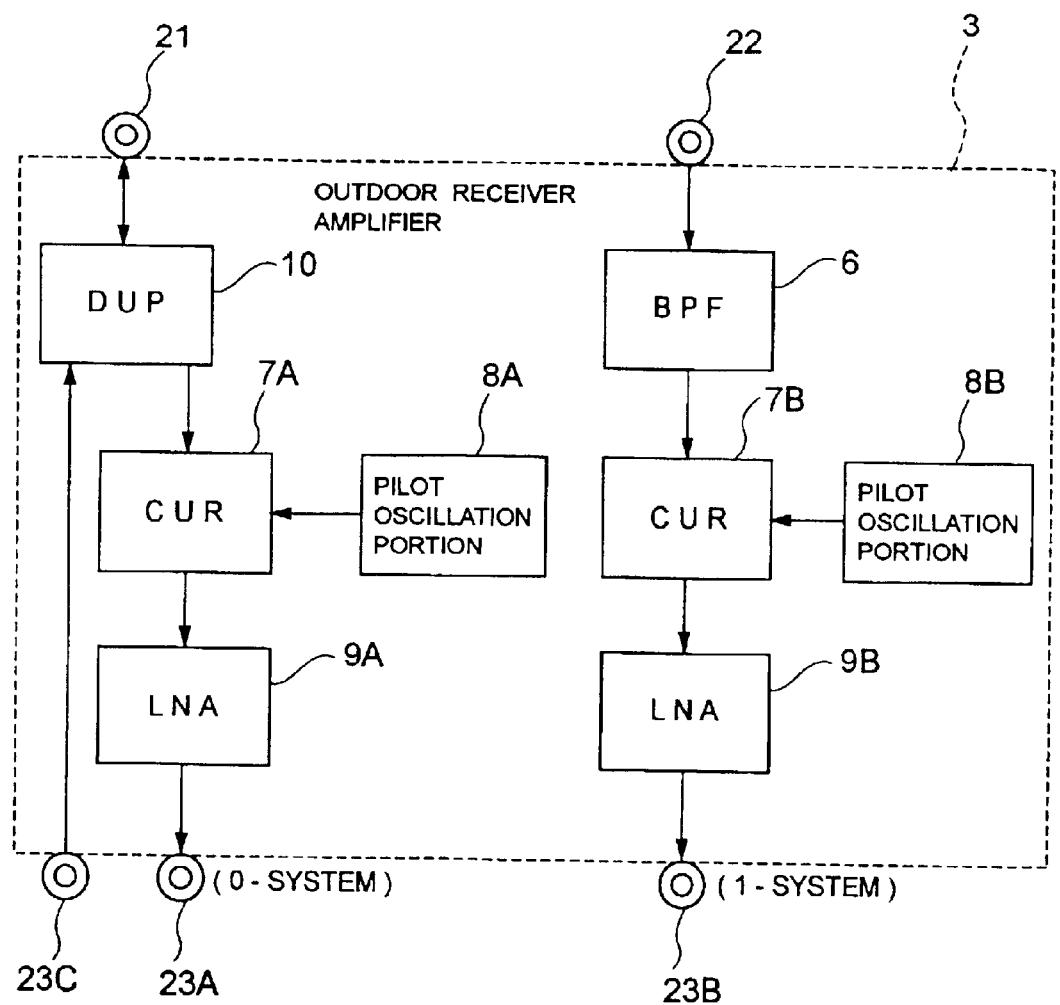
FIG. 2 is a diagram showing a configuration of an example of an outdoor receiver amplifier 3.

The configuration of the outdoor receiver amplifier 3 will next be described. FIG. 2 is a diagram showing the configuration of an example of the outdoor receiver amplifier 3. Referring to FIG. 2, the outdoor receiver amplifier 3 is constituted by a duplexer 10 (hereinafter referred to as DUP 10) which separates a transmitted wireless signal from the wireless base station apparatus 5 within a band by eliminating useless energy outside the band for outputting to the transmitting/receiving antenna 1, and separates a received wireless signal from the transmitting/receiving antenna 1 within a band by eliminating useless energy outside the band, a pilot signal oscillation portion 8A forming a signal source for detection of a malfunction of the outdoor receiver amplifier 3, a circulator portion 7A (hereinafter referred to as CUR 7A) which outputs in a predetermined direction the received wireless signal and a pilot signal from the pilot signal oscillation portion 8A, and a low-noise amplification portion 9 (hereinafter referred to as LNA 9A) to which power from the feeder 4A is input and which performs low-noise amplification of the received wireless signal.

Similarly to the path from the transmitting/receiving antenna 1, a path for a received wireless signal from the receiving-only antenna 2 is formed by a band-pass filter 6 (hereinafter referred to as BPF 6) which separates the received wireless signal within a band by eliminating useless energy outside the band, a CUR 7B, a pilot oscillation portion 8B, and an LNA 9B.

A terminal 21 is a connection terminal of the transmitting/receiving antenna 1; a terminal 22 is a connection terminal of the receiving-only antenna 2; a terminal 23C is a transmitted signal input terminal; a terminal 23A is a 0-system received signal output terminal; and a terminal 23B is a 1-system received signal output terminal.

Figure 3:
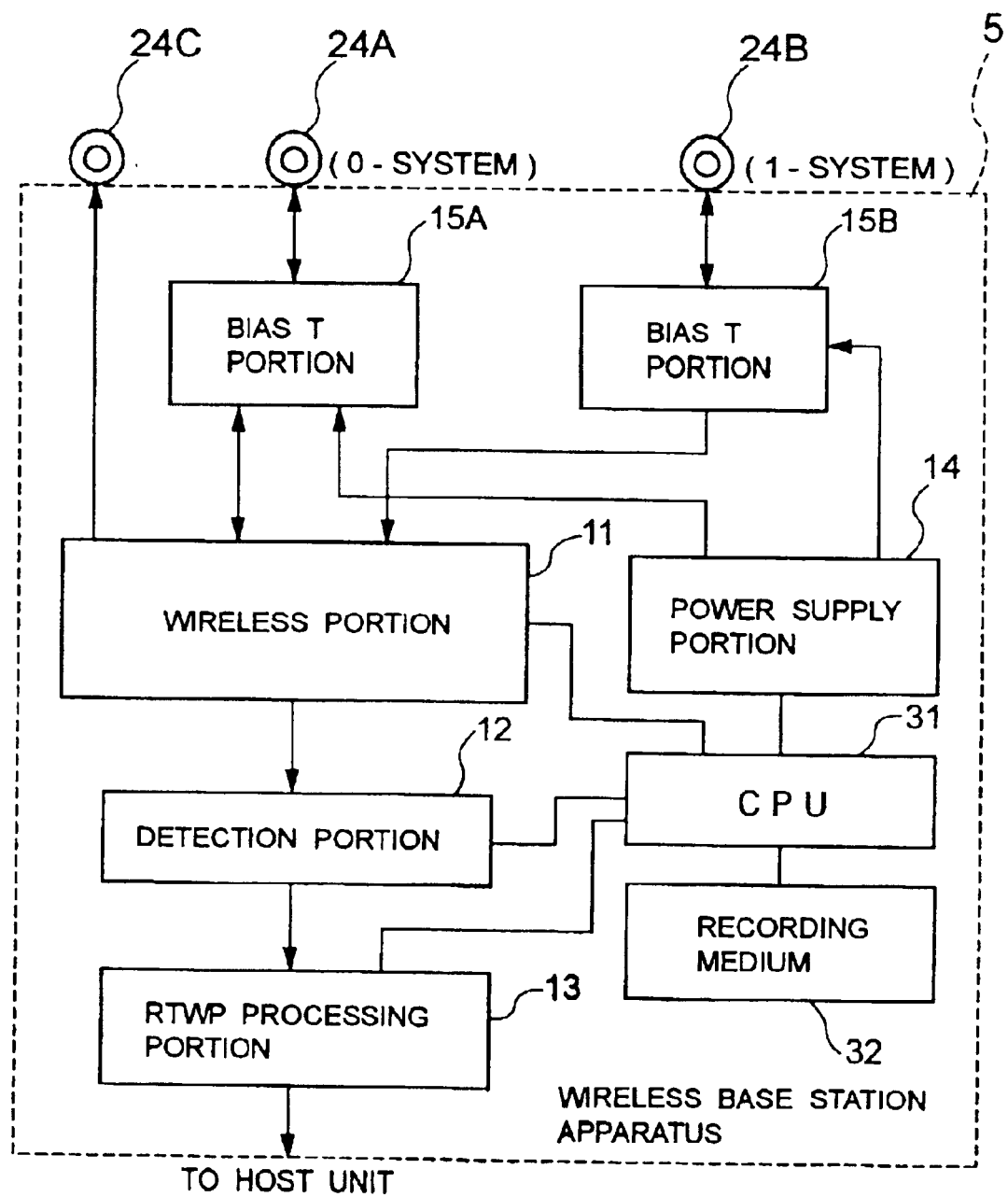
FIG. 3 is a diagram showing a configuration of an example of a wireless base station apparatus 5.

The configuration of the wireless base station apparatus 5 will next be described. FIG. 3 is a diagram showing the configuration of an example of the wireless base station apparatus 5. Referring to FIG. 3, the wireless base station apparatus 5 is constituted by a wireless portion 11 which generates a wireless signal to be transmitted and demodulates received wireless signals in two systems, i.e., a 0-system and a 1-system, a power supply portion 14 which generates power to be supplied to the outdoor receiver amplifier 3, and bias T portions 15A and 15B which separate or multiplex received wireless signals and power, which supply the received wireless signals from the outdoor receiver amplifier 3 to the wireless portion 11 in a superposition manner, and which supply power from the power supply portion 14 to the receiving feeders 4A and 4B in a superposition manner. The wireless base station apparatus 5 is also constituted by a detection portion 12 which detects and determines signals demodulated by the wireless portion 11, i.e., the signals from the pilot oscillation portions 8A and 8B of the outdoor receiver amplifier 3, an RTWP processing portion 13 which performs RTWP processing by computing an NF of the outdoor receiver amplifier 3 from a report value from the detection portion 12, a central processing unit (CPU) 31 described below, and a recording medium 32.

Embodiments of the present invention will be described below as examples of the operation in the mode of implementation of the present invention by using concrete numeric values. Now, a first embodiment will be described. The first embodiment is an application of the present invention to a mobile communication system using as an access method a direct sequence-CDMA (DS-CDMA) having a chip rate of 3.84 Mbps.

Figure 4:
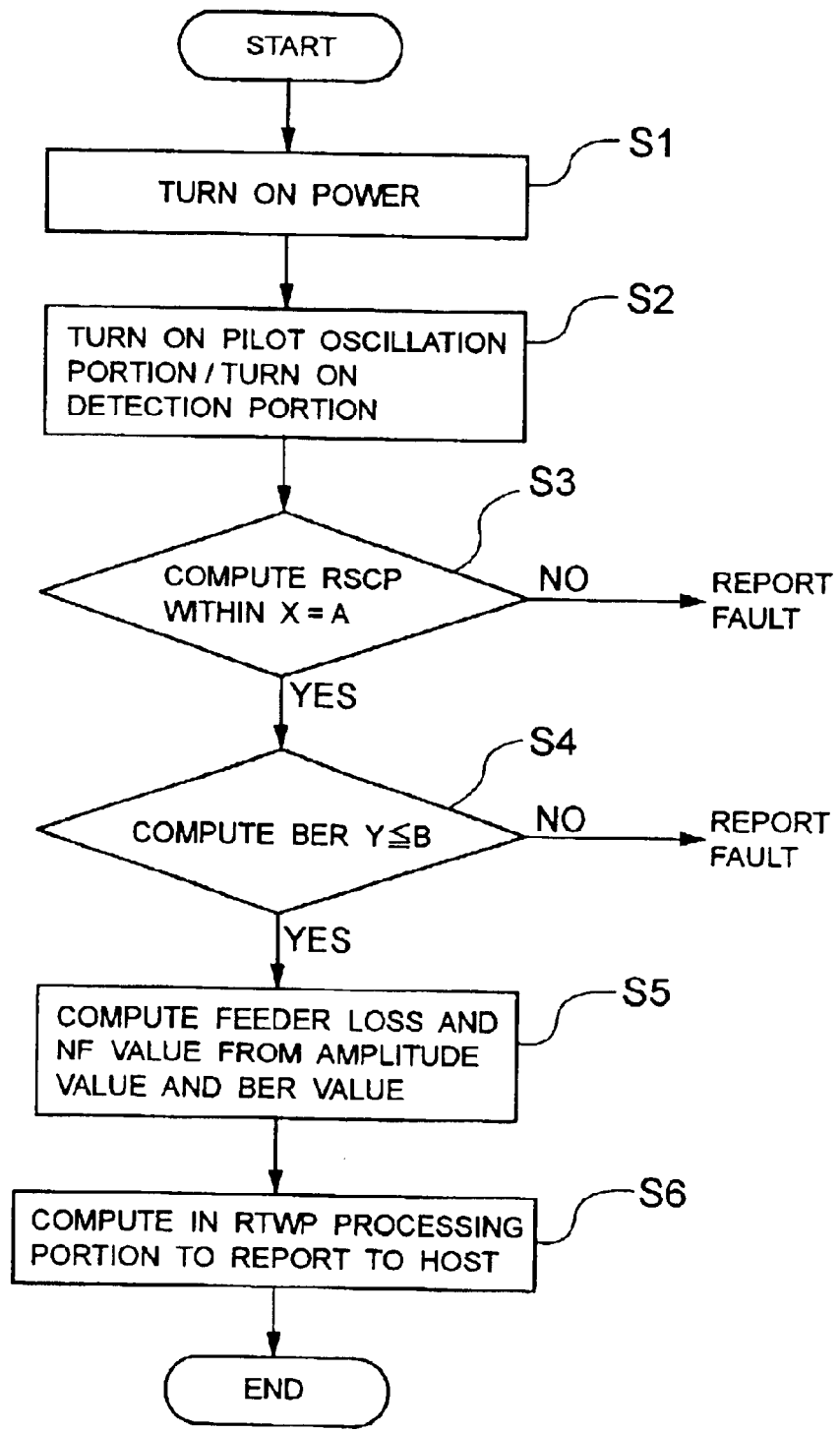
FIG. 4 is a flowchart showing an operation of a first embodiment of the invention.
Figure 5:
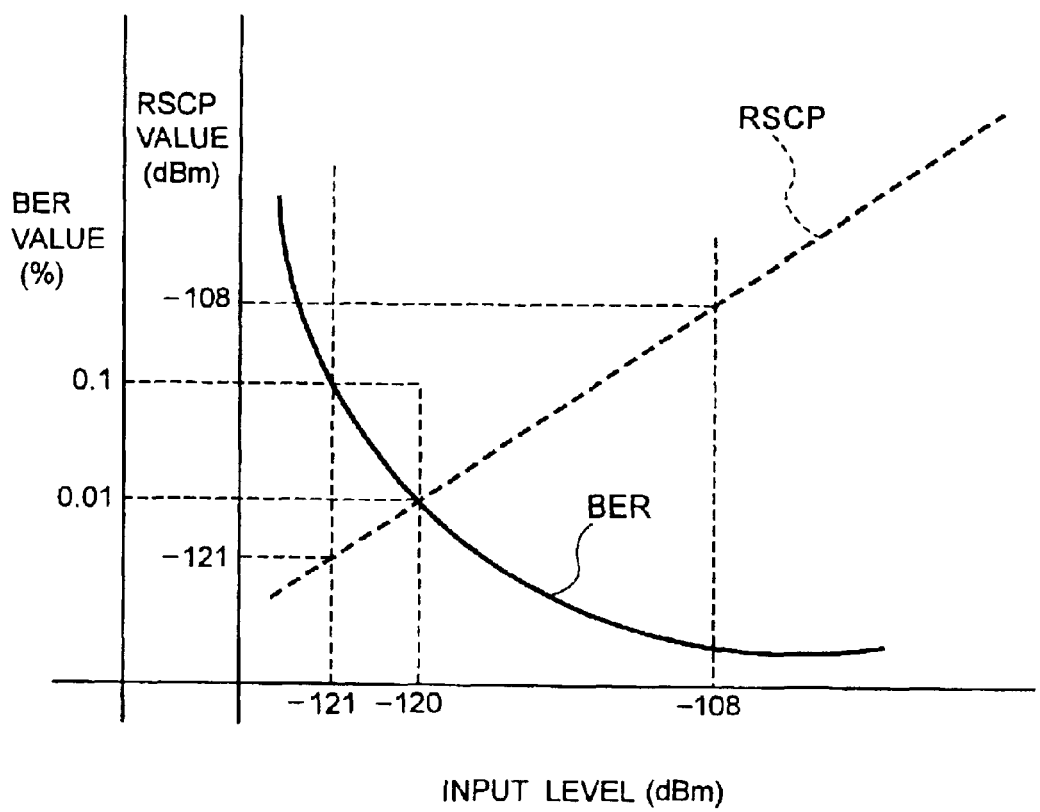
FIG. 5 is a diagram showing an input level-vs.-BER/RSCP characteristic of a wireless portion 11.
Figure 6:
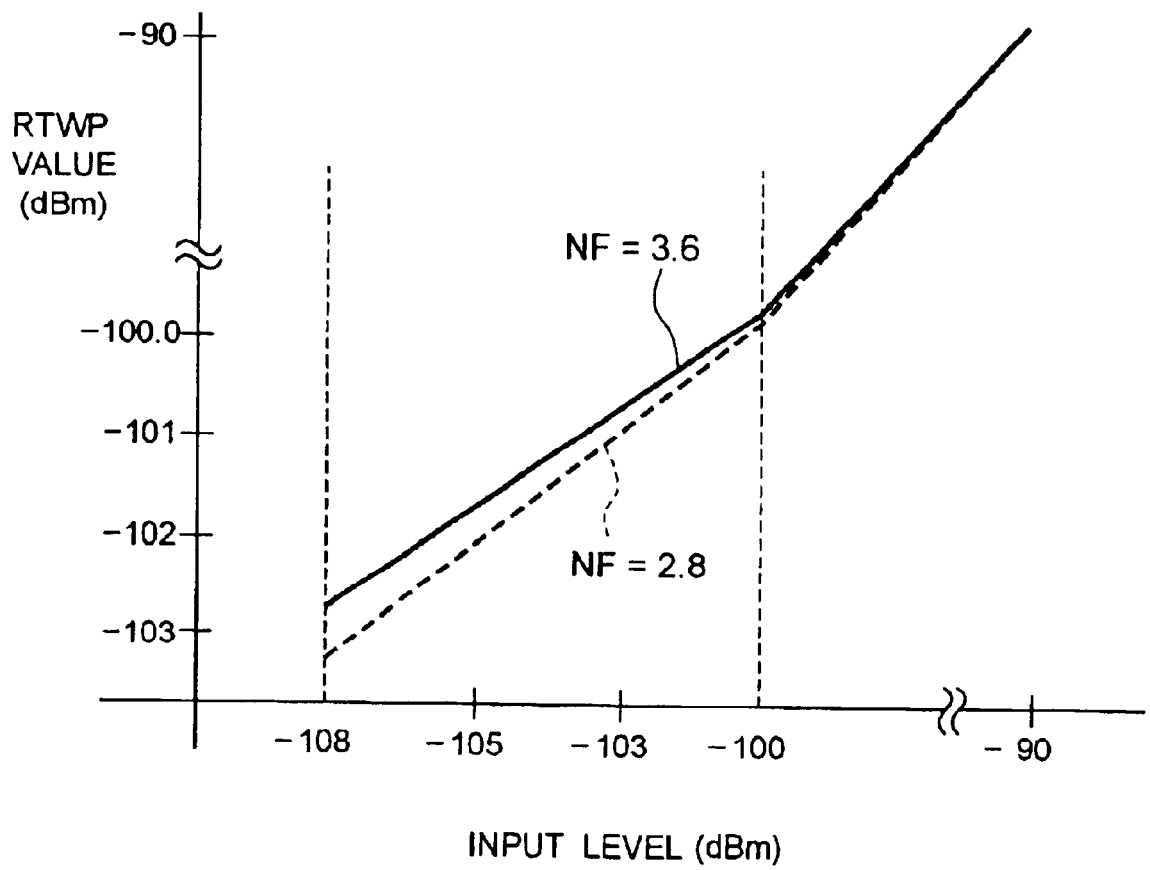
FIG. 6 is a diagram showing an input level-vs.-RTWP characteristic of the wireless portion 11.

FIG. 4 is a flowchart showing the operation of the first embodiment; FIG. 5 is diagram showing an input level-vs.-BER/RSCP characteristic of the wireless portion 11; FIG. 6 is a diagram showing an input level-vs.-RTWP characteristic of the wireless portion 11; FIG. 7 is a diagram of the NF level in the wireless base station system; and FIG. 8 is a diagram showing NF/RTWP characteristics of the wireless base station system. The operation of the first embodiment will be described with reference to FIGS. 1 to 8. The outdoor receiver amplifier 3 and the wireless base station apparatus 5 of the present invention are assumed to have a diversity function on the receiving side only.

The flow of transmitted wireless signal in the transmitting system will first be described. The wireless portion 11 of the wireless base station apparatus 5 generates and outputs a predetermined modulated WCDMA wave for communication with a mobile device. The output transmitted wireless signal is supplied to the outdoor receiver amplifier 3 via the transmitting system feeder 4C, band-restricted by the DUP 10 in the outdoor receiver amplifier 3, and supplied to the transmitting/receiving antenna 1.

The flows of received wireless signals in the receiving system are as described below. A 0-system received wireless signal is received by the transmitting/receiving antenna 1, receiving-band-restricted by the DUP 10, supplied to the LNA 9A via the CUR 7A, power-amplified to a predetermined degree of amplification by the LNA 9A, and output from the outdoor receiver amplifier 3.

The 0-system received wireless signal output from the receiver amplifier 3 is input to the wireless base station apparatus 5 via the 0-system receiving feeder 4A, supplied to the wireless portion 11 through the bias T portion 15A, and demodulated by CDMA despreading in the wireless portion 11.

Similarly, in the 1-system, a 1-system received wireless signal is received by the receiving-only antenna 2, receiving-band-restricted by the BPF 6, supplied to the LNA 9B via the CUR 7B, power-amplified to a predetermined degree of amplification by the low-noise amplifier 9B, and output from the outdoor receiver amplifier 3.

The 1-system received wireless signal output from the receiver amplifier 3 is input to the wireless base station apparatus 5 through the 1-system receiving feeder 4B, supplied to the wireless portion 11 through the bias T portion 15B, and demodulated by CDMA despreading in the wireless portion 11.

Supply of power to the outdoor receiver amplifier 3 will be described. First, a predetermined voltage is generated by the power supply portion 14 of the wireless base station apparatus 5. The bias T portions 15A and 15B superimpose this voltage on the signals transmitted through the feeders 4A and 4B. Power supplied via each of the feeders 4A and 4B is separated from the superimposed signals in the LNA 9A or 9B. The LNAs 9A and 9B perform predetermined low-noise amplification.

The DS-WCDMA system is thus constructed which uses the wireless base station system constituted by the wireless base station apparatus 5, the outdoor receiver amplifier 3, the transmitting/receiving antenna 1 and the receiving-only antenna 2 and having the above-described signal flows, thereby enabling communication between mobile terminals.

The outdoor receiver amplifier 3 is ordinarily placed in such an environment that its maintainability is low, i.e., at a position immediately below the outside antenna.

The flows of signals for detection of a fault in the outdoor receiver amplifier 3 will be described. First, in the 0-system receiving line, a WCDMA wave is generated at a predetermined level in a predetermined code in the pilot oscillation portion 8A to be output as a pilot signal. This pilot signal is transmitted to the wireless portion 11 via the CUR 7A, the low-noise amplifier 9A, the feeder 4A, and the bias T portion 15A of the wireless base station apparatus 5 and is despread at a predetermined spreading gain by the wireless portion 11. Fault detection is performed in the detection portion 12 by determining whether this despread signal is within a predetermined received signal code power (RSCP) range and within a predetermined bit error rate (BER) range. Also, an NF value is computed from the RSCP value and the BER value.

The wireless portion 11 computes the BER value (on a curve similar to a hyperbolic curve) corresponding to the input level and the RSCP value linearly proportional to the input level, as shown in FIG. 5. That is, the wireless portion 11 has the function of computing the RSCP value and the BER value corresponding to the input level from the input level. The NF value of the equipment is obtained by an inverse operation from the BER value in particular, and a received input level value (RTWP value) determined by the RTWP processing portion 13 so as to include a value relating to the NF value is reported to a host unit.

Similarly, in the 1-system receiving line, a WCDMA wave generated in the pilot oscillation portion 8B is transmitted to the wireless portion 11 via the CUR 7B, the low-noise amplifier 9B, the feeder 4B, and the bias T portion 15B of the wireless base station apparatus 5 and is despread at a predetermined spreading gain by the wireless portion 11. The despread signal undergoes the same processing in the detection portion 12.

A standard sensitivity of the wireless base station system is prescribed in the specification (TS25.104) provided by the 3rd Generation Partnership Project Working Group 4 (3GPP WG4) such that the input level when the data rate is 12.2 kbps and when the BER is 0.1% is −121 dBm or less.

The following is a basis for setting this value, on which an agreement was reached:

$$\text{Standard sensitivity [dBm]} = -174[\text{dBm/Hz}] + 10*\log(12.2\text{ k}) [\text{dBHz}] + Eb/No + NF + \text{Margin} \quad (1)$$

where Eb/No is 5.09 dB, NF value is 5 dB, and Margin is 2 dB. With respect to the definition of the RTWP value, an agreement was also reached on adding a value relating to the NF and thermal noise of the equipment to the total power received through antenna input terminal.

In WCDMA wireless system design, therefore, there is a need to set the total NFt from the antenna end equal to or smaller than 5 dB ("Margin" ignored). A concrete example of the total NFt setting is shown below in detail with respect to a case where the gain Ga of the outdoor receiver amplifier 3 is 40 dB, the NFa value of the outdoor receiver amplifier 3 is 3 dB, the feeder loss NFb is 30 dB, and the NFc value of the wireless portion 11 is 5 dB.

The total NFt of the wireless base station system is first obtained.

$$NFt = 10\log(10^{\wedge}(NFa/10) + ((10^{\wedge}((NFb/10 + NFc/10)/10) - 1)/10^{\wedge}(Ga/10))) \quad (2)$$

From this equation, a total NFt value of 3.6 dB is obtained (see ① in FIG. 7). Thus, a wireless level diagram satisfying the standard sensitivity requirement can be obtained.

As described above in detail, the standard sensitivity is determined from NFa and gain Ga of the outdoor receiver amplifier 3, feeder loss NFb, and NFc of the wireless portion 11. NFa of the outdoor receiver amplifier 3 is determined from the losses in the DUP 10 and the BPF 6, which are passive devices, (the losses in the CURs 7A and 7B ignored) and NFd of the LNAs 9A and 9B.

For example, the desired value of NFt of the outdoor receiver amplifier 3, e.g., 3 dB can be obtained if the loss due to the DUP 10 and the BPF 6 is 1 dB and if NFd of the LNAs 9A and 9B is 2 dB. In this case, if the gain Ga is 40 dB, it is required that the gain of the LNAs 9A and 9B be 40 dB+1 dB=41 dB.

With respect to the WCDMA signal generated by the pilot oscillation portion 8A or 8B, the total NF from the pilot oscillation portion 8A or 8B is influenced by the NF after the CUR 7A or 7B. For ease of computation, it is assumed that the loss from each of the pilot oscillation portions 8A and 8B of CURs 7A and 7B to the LNA 9A or 9B is 1 dB, equal to that in the case of the DUP 10. Thus, the total NFt of the wireless base station system is equal to the total NFe from the pilot portion 8A or 8B.

More specifically, the RSCP value and the BER value obtained when a −121 dBm WCDMA signal is input to one of the antenna input terminals and the RSCP value and the BER value obtained when the −121 dBm WCDMA signal is output from the pilot portion 8A or 8B can be computed as the same values.

A method computing the RTWP value is defined as described below. A value relating to the NF and thermal noise of the equipment is added to the total power received through each of the antenna input terminals, i.e., the transmitting/receiving antenna 1 and the receiving-only antenna 2. The total power is the entire WCDMA energy input to the antenna. That is, if a plurality of mobile terminals exist, the total power is the sum of the value of power totalized from the mobile terminals and the level of thermal noise. The NF of the equipment is the NFt from the antenna terminal, i.e., the total NF of the wireless base station system.

More specifically, if the level of an input to the transmitting/receiving antenna 1 or the receiving-only antenna 2 is A (dBm); the thermal noise level is B (dBm)=−108 (dBm/3.84 MHz); and the equipment NF is NFt (dB), the value (RTWP) measured through the equipment is as expressed by $$RTWP = 10 * \log(10^{(A/10)} + 10^{((B+NFt)/10)}) \quad (3)$$

Then, if NFt is 3.6 dB and if the input level is −108/−105/−103/−100/−90 dBm, processing in the RTWP processing portion 13 of the wireless base station apparatus 5 should be performed so that the RTWP report value is −102.8/−101.7/−100.6/−98.7/−89.8 dBm (see FIGS. 8 and 6).

An RTWP detection method in accordance with the present invention will next be described below with reference to FIG. 4. The above-described gain, NF, and loss values are used with respect to the outdoor receiver amplifier 3, the feeders 4A and 4B, and the wireless portion 11. Generally speaking, it is preferred that the RTWP value detection process be executed before the WCDMA system becomes operational, and that, after the system has started operating, the RTWP value detection process be executed periodically or in a situation where variation in a natural environment, e.g., variation in open-air temperature is small and traffic is low.

When the power supply portion 14 is turned on (S1), the voltage is applied to the LNAs 4A and 4B and to the pilot oscillation portions 8A and 8B (S2) and the pilot oscillation portions 8A and 8B output WCDMA signals in a predetermined code at a transmission rate of 12.2 kbps and at −121 dBm. The output signals are despread at a spreading gain of (10 log 3.84 mbps/12.2 kbps=25 dB) in the wireless portion 11. The RSCP value is computed from the despread signals (RSCP value assumed to be XdBm). The parameters for computation of the RSCP value are uniquely determined from the wireless level diagram (the characteristic diagram of FIG. 5).

From the output power from the pilot oscillation portion 8A or 8B, the gain of the outdoor receiver amplifier 3, the loss in the feeder 4A or 4B and the spreading gain, $$X = -121 \text{ dBm} + 40 \text{ dB} + (-30 \text{ dB}) + 25 \text{ dB} = -86 \text{ dBm} \quad (4)$$

is computed. The value thus computed is computed to obtain a relative value. That is, the antenna input RSCP value −121 dBm is computed (S3). If the RSCP value thus computed and converted is within the range A=−122 to −120 dBm, it is determined that the system has no amplitude fault (that is, it is operating normally).

Subsequently, the BER is computed (BER assumed to be Y %) (S4). If, for example, Y=0.1% is thereby obtained (see FIG. 5), Y does not exceed B=0.2% (that is, Y≦B), it is determined that the system has no BER fault (that is, it is operating normally).

Subsequently, the feeder loss of 30 dB is computed by inverse operation from the RSCP value and the BER value obtained this time. Total NFt=3.6 dB is thereby obtained (S5). The NFt value of the equation (3) computed by the RTWP processing portion 13 is initialized to 3.6 dB according to this obtained NFt, thus completing the process (S6).

A second embodiment of the present invention will next be described. An example of the operation in a case where a decrease in open-air temperature, for example, occurs as a change in a natural environment (generally, the NF of the active element is thereby reduced; for example, the NF of the LNAs 9A and 9B is reduced from 2 dB to 1 dB (see ②) in FIG. 7) will be described in detail. With respect to the −121 dBm WCDMA signal from the pilot oscillation portions 8A and 8B, the wireless level diagram is not changed from that initially set. Therefore the RSCP value (XdBm) is computed also from −121 dBm. On the other hand, the BER value (Y %) is computed to be recognized as improved (Y=0.01%) due to the reduced NF of the LNAS. That is, the BER in this case is equivalent to the BER value (0.01%) computed in a situation where an input having a level (−120 dBm) higher than the ordinarily input level (−121 dBm) in the input level-BER characteristic of the wireless portion 11 (see FIG. 5) is given. The input level is virtually offset by 1 dB. Inverse operation from this offset value is performed to obtain the NFt. The resulting NFt according to the BER characteristic is 2.8 dB.

The value 2.8 dB is stored as NFt of the RTWP processing portion 13. If the input level is −108/−105/−103/−100/−90 dBm, the RTWP value corresponding to the input level is −103.4/−102.1/−101/−98.9/−89.8 dBm (see ② in FIG. 8 and FIG. 6).

Thus, even when the NF of an outdoor receiver amplifier is changed due to a change in natural environment, the correct RTWP value at the current time can be computed by the process of this embodiment shown in the flowchart.

A third embodiment of the present invention will be described. Even in a case where a wireless base station system is constructed, for example, with such a feeder length that the feeder loss is 25 dB, the following computation can be performed if the basic form of the wireless level diagram is provided. A fixed amplification degree of 40 dB for an outdoor air receiver amplifier (OARA), a feeder loss of α dB, and an RSCP value of −81 dBm after despreading in the wireless portion 11 are computed from the pilot output level −121 dBm. Thus, the value 25 dB smaller by 5 dB than the feeder loss reference value 30 dB can be computed. Next, an equipment NFt value of 3.2 dB can be computed by inverse operation from the corresponding BER value 0.01% and the value 25 dB (see ③ in FIG. 7).

Figure 9:
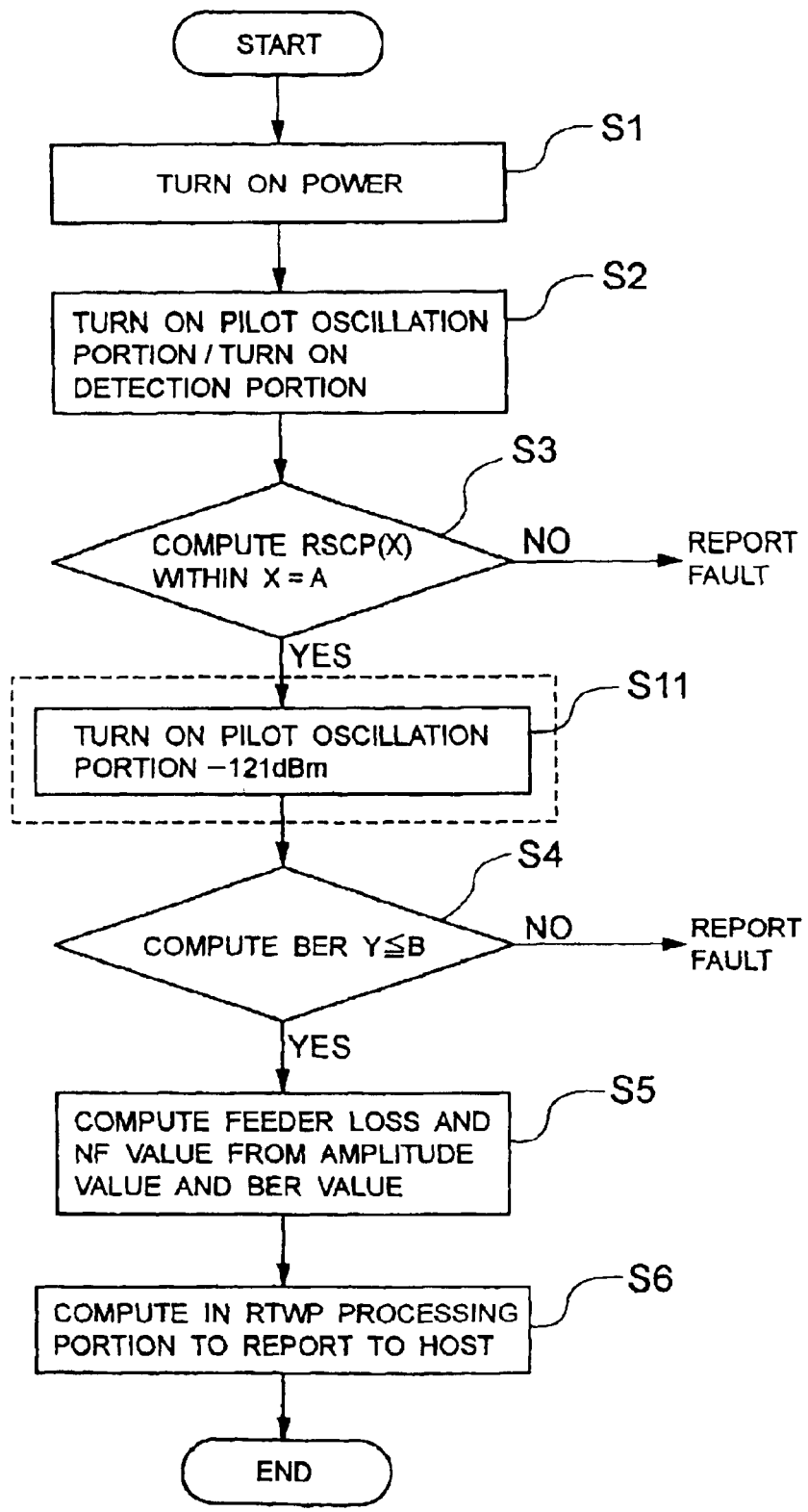
FIG. 9 is a flowchart showing an operation of a fourth embodiment.

A fourth embodiment of the present invention will be described. FIG. 9 is a flowchart showing an operation of the fourth embodiment. The flowchart of FIG. 9 is formed by adding a step S11 between steps S3 and S4 shown in the flowchart of FIG. 4, and steps S1 to S6 shown in the flowchart of FIG. 9 are the same as those in FIG. 4. Therefore the description of these steps will not be repeated.

In the above-described embodiments, a fixed value of −121 dBm is used as the output level of the above-described pilot oscillation portions 8A and 8B even for computation of the RSCP value and the BER value. Alternatively, the output level of the pilot oscillation portions 8A and 8B is increased, for example, by 20 dB in advance to ensure detection of the RSCP value in a situation where RTWP processing may be influenced by an external factor, e.g., high traffic. The output level is thereafter returned to −121 dBm (step S11) and the BER value is computed.

A fifth embodiment of the present invention will be described. The fifth embodiment relates to a recording medium on which a program for making a computer carry out the method of monitoring the receiving portion in the wireless base station system is stored.

The wireless base station apparatus 5 shown in FIG. 3 includes the CPU 31 and the recording medium 32. A program for making the computer execute the process shown in the flowchart of FIG. 4 or 9 is recorded on the recording medium 32. The CPU 31 reads out the program from the recording medium 32 and controls the power supply portion 14, the wireless portion 11, the detection portion 12, and the RTWP processing portion 13 in accordance with the program. The contents of the program have already been described and the description of them will be omitted.

According to the present invention, a receiving portion monitoring system in a wireless base station system includes receiving and amplifying means for amplifying a received signal, and wireless base station means for detecting a fault in the receiving and amplifying means on the basis of a demodulated signal obtained by demodulating a signal output from the receiving and amplifying means; the receiving and amplifying means includes a pilot signal generation portion which generates a pilot signal for detection of a fault, and an amplifier which amplifies the received signal and the pilot signal; and the wireless base station means includes a wireless portion which demodulates a signal output from the amplifier and computes an RSCP value and a BER value from the demodulated signal, a detection portion which computes a feeder loss and an NF value between the receiving and amplifying means and the wireless base station means from the computed RSCP and BER values, and an RTWP processing portion which outputs an RTWP value including a value relating to the NF value detected by the detection portion. The above-described problem can be solved by this system.

More specifically, a first advantage of the present invention resides in that the feeder loss can be automatically computed. This is because the RSCP value can be computed by despreading in the wireless portion a predetermined WCDMA signal from the pilot oscillation portion.

A second advantage of the present invention resides in that the NF of the outdoor receiver amplifier can be automatically computed. This is because the BER value can be computed by despreading in the wireless portion a predetermined WCDMA signal from the pilot oscillation portion.

A third advantage of the present invention resides in that the maintainability of the outdoor receiver amplifier is improved, there is no need to move measuring devices to measurement places, and there is no need to perform operations in any dangerous place, e.g., immediately below the outside antenna. This is because the NF of the outdoor receiver amplifier and the loss in the feeder can be computed by despreading in the wireless portion a predetermined WCDMA signal from the pilot oscillation portion.

A fourth advantage of the present invention resides in that variation in the NF of the outdoor receiver amplifier due to variation in a natural environment can be detected. This is because the BER can be computed by despreading in the wireless portion a predetermined WCDMA signal from the pilot oscillation portion.

A fifth advantage of the present invention resides in that the RTWP can be computed with accuracy even in the case of a multivendor configuration of the outdoor receiver amplifier. This is because the NF of the outdoor receiver amplifier can be computed and because the initial value of the equation for computation in the RTWP processing portion can be changed.

What is claimed is:

1. A receiving portion monitoring system in a wireless base station system, comprising:

receiving and amplifying means for amplifying a received signal; and wireless base station means for demodulating a signal output from said receiving and amplifying means and for detecting a fault in said receiving and amplifying means on the basis of the demodulated signal, wherein said receiving and amplifying means includes a pilot signal generation portion which generates a pilot signal for detection of a fault, and an amplifier which amplifies the received signal and the pilot signal, and said wireless base station means includes a wireless portion which demodulates a signal output from said amplifier and computes an RSCP value and a BER value from the demodulated signal, a detection portion which computes a feeder loss and an NF value between said receiving and amplifying means and said wireless base station means from the computed RSCP and BER values, and an RTWP processing portion which outputs an RTWP value including a value relating to the NF value detected by said detection portion.

2. The receiving portion monitoring system according to claim 1, wherein said detection portion makes a determination as to whether each of the computed RSCP and BER values is within a predetermined range.

3. The receiving portion monitoring system according to claim 1, wherein the loss in the path through which the received signal is input to said amplifier and the loss in the path which the pilot signal is input to said amplifier are equal to each other.

4. The receiving portion monitoring system according to claim 1, wherein said wireless portion computes the RSCP value and the BER value by using the input level-vs.-RSCP value/BER value characteristic table.

5. The receiving portion monitoring system according to claim 1, wherein said RSCP value is computed from the output power of the pilot signal, the gain of said amplifier, the feeder loss between said receiving and amplifying means and said wireless base station means, and the spreading gain of said wireless portion.

6. The receiving portion monitoring system according to claim 1, wherein said NF value is computed from the NF value and the gain of said amplifier, the feeder loss between said receiving and amplifying means and said wireless base station means, and the NF value of said wireless portion.

7. The receiving portion monitoring system according to claim 1, wherein said RTWP value is computed from the input level of the received signal, a thermal noise level, and the NF value.

8. A receiving portion monitoring method for a wireless base station system including receiving and amplifying means for amplifying a received signal, and wireless base station means for demodulating a signal output from the receiving and amplifying means and for detecting a fault in the receiving and amplifying means on the basis of the demodulated signal, wherein said receiving and amplifying means includes a pilot signal generation portion which generates a pilot signal for detection of a fault, and an amplifier which amplifies the received signal and the pilot signal, and said wireless base station means comprises:

a first step of demodulating a signal output from the amplifier and computing an RSCP value and a BER value from the demodulated signal;

a second step of computing a feeder loss and an NF value between the receiving and amplifying means and the wireless base station means from the computed RSCP and BER values; and a third step of outputting an RTWP value including a value relating to the NF value detected in the second step.

9. The receiving portion monitoring method according to claim 8, wherein said second step comprises making a determination as to whether each of the computed RSCP and BER values is within a predetermined range.

10. The receiving portion monitoring method according to claim 8, wherein the loss in the path through which the received signal is input to the amplifier and the loss in the path which the pilot signal is input to the amplifier are equal to each other.

11. The receiving portion monitoring method according to claim 8, wherein in said first step said RSCP value and said BER value are computed by using the input level-vs.-RSCP value/BER value characteristic table.

12. The receiving portion monitoring method according to claim 8, wherein said RSCP value is computed from the output power of the pilot signal, the gain of the amplifier, the feeder loss between the receiving and amplifying means and the wireless base station means, and the spreading gain of said first step.

13. The receiving portion monitoring method according to claim 8, wherein said NF value is computed from the NF value and the gain of the amplifier, the feeder loss between the receiving and amplifying means and the wireless base station means, and the NF value of said first step.

14. The receiving portion monitoring method according to claim 8, wherein said RTWP value is computed from the input level of the received signal, a thermal noise level, and the NF value.

15. The receiving portion monitoring method according to claim 8, further comprising a step of increasing the level of the pilot signal by a predetermined value than a reference value in advance, and returning the level of the pilot signal to the reference value between computation of the RSCP value and computation of the BER value in said first step.

16. A recording medium on which there is recorded a program for making a computer carry out a receiving portion monitoring method for a wireless base station system including receiving and amplifying means for amplifying a received signal, and wireless base station means for demodulating a signal output from the receiving and amplifying means and for detecting a fault in the receiving and amplifying means on the basis of the demodulated signal, wherein said receiving and amplifying means includes a pilot signal generation portion which generates a pilot signal for detection of a fault, and an amplifier which amplifies the received signal and the pilot signal, the wireless base station means including the recording medium, and said program includes:

a first step of demodulating a signal output from the amplifier and computing an RSCP value and a BER value from the demodulated signal;

a second step of computing a feeder loss and an NF value between the receiving and amplifying means and the wireless base station means from the computed RSCP and BER values; and a third step of outputting an RTWP value including a value relating to the NF value detected in the second step.

17. The recording medium according to claim 16, wherein said second step comprises making a determination as to whether each of the computed RSCP and BER values is within a predetermined range.

18. The recording medium according to claim 16, wherein the loss in the path through which said received signal is input to the amplifier and the loss in the path which the pilot signal is input to the amplifier are equal to each other.

19. The recording medium according to claim 16, wherein in said first step said RSCP value and said BER value are computed by using the input level-vs.-RSCP value/BER value characteristic table.

20. The recording medium according to claim 16, wherein said RSCP value is computed from the output power of the pilot signal, the gain of the amplifier, the feeder loss between the receiving and amplifying means and the wireless base station means, and the spreading gain of said first step.

21. The recording medium according to claim 16, wherein said NF value is computed from the NF value and the gain of the amplifier, the feeder loss between the receiving and amplifying means and the wireless base station means, and the NF value of said first step.

22. The recording medium according to claim 16, wherein said RTWP value is computed from the input level of the received signal, a thermal noise level, and the NF value.

23. The recording medium according to claim 16, further comprising the steps of:

increasing the level of said pilot signal by a predetermined value than a reference value in advance, and returning the level of the pilot signal to the reference value between computation of the RSCP value and computation of the BER value in said first step.

* * * * *